United States Patent
Schwartz et al.

(10) Patent No.: US 10,553,030 B2
(45) Date of Patent: Feb. 4, 2020

(54) METHOD AND APPARATUS FOR IMPROVING MIXED REALITY SITUATIONAL AWARENESS

(71) Applicant: The Charles Stark Draper Laboratory, Inc., Cambridge, MA (US)

(72) Inventors: Jana Lyn Schwartz, Washington, DC (US); Emily Catherine Vincent, Somerville, MA (US); Meredith Gerber Cunha, Brighton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 30 days.

(21) Appl. No.: 15/721,832

(22) Filed: Sep. 30, 2017

(65) Prior Publication Data

US 2018/0096535 A1 Apr. 5, 2018

Related U.S. Application Data

(60) Provisional application No. 62/402,673, filed on Sep. 30, 2016.

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/011* (2013.01); *G06K 9/00671* (2013.01); *G09G 2340/12* (2013.01)

(58) Field of Classification Search
CPC .............................. G06T 19/006; G06T 19/00
(Continued)

(56) References Cited

U.S. PATENT DOCUMENTS 7,920,071 B2 * 4/2011 Baillot ................. G05D 1/0027
340/937
9,262,924 B2 2/2016 McNew
(Continued)

FOREIGN PATENT DOCUMENTS

DE         25 55 429        6/1977
FR         2 598 316        11/1987
WO    WO 2015/100482     7/2015

OTHER PUBLICATIONS

Parasuraman, R., Sheridan, T. B., & Wickens, C. D. (2000). A model for types and levels of human interaction with automation.IEEE Transactions on Systems, Man, and Cybernetics—Part A: Systems and Humans, 30(3), 286-297.*
(Continued)

*Primary Examiner* — Jin Ge
(74) *Attorney, Agent, or Firm* — Sunstein Kann Murphy & Timbers LLP

(57) ABSTRACT

Decision making speed of a human is improved by presenting data to the human in ways that enable the human to receive the data at higher rates, and spend more time analyzing received data. The data may represent information, such as infrared imagery or map data, that is not directly perceivable by the human. An individual datum may be presented to the human via multiple senses, to make receiving the datum easier, and to make it more likely that the datum is received, especially in contexts where the human may be busy, stressed, cognitively loaded or distracted by other demands on the human's attention. Some embodiments automatically select which sense or combination of senses to use for presenting each datum, based on various factors, such as how the human's current environment may interfere with the human's ability to receive or process the datum or how busy a given sense is.

28 Claims, 7 Drawing Sheets

(51) Int. Cl.
*G06F 3/01* (2006.01)
*G06K 9/00* (2006.01)

(58) Field of Classification Search
USPC .................................................. 345/633
See application file for complete search history.

(56) References Cited

U.S. PATENT DOCUMENTS

| | | | |
|---|---|---|---|
| 2008/0146302 A1* | 6/2008 | Olsen ................... | A63F 13/213 463/7 |
| 2009/0013052 A1* | 1/2009 | Robarts ................ | G06Q 10/107 709/206 |
| 2014/0260714 A1 | 9/2014 | Vallery et al. | |
| 2015/0177939 A1* | 6/2015 | Anderson ............. | G06F 21/35 715/745 |
| 2015/0216682 A1 | 8/2015 | Achyuta et al. | |
| 2016/0091877 A1* | 3/2016 | Fullam .................. | G05B 15/02 700/276 |
| 2016/0184703 A1* | 6/2016 | Brav ..................... | G06F 3/012 463/30 |
| 2016/0381415 A1* | 12/2016 | Vijay .................. | H04N 21/44218 725/12 |
| 2017/0178407 A1* | 6/2017 | Gaidar ................. | G06T 19/006 |

OTHER PUBLICATIONS

H.W. Gellersen, A. Schmidt, M. Beigl, Multi-sensor context-awareness in mobile devices and smart artifacts, Mobile Networks and Applications 7 (5) (2002) 341351.*

Chiu, et al., "Design of a Wearable Scissored-Pair Control Moment Gyroscope (SP-CMG) for Human Balance Assist," (Abstract), vol. 5A: 38th Mechanisms and Robotics Conference, 1 page, 2014.

Howard, "What is lane departure warning, and how does it work?" https://www.extremetech.com, 8 pages, Sep. 3, 2013.

Vibrant, "The Power of Touch, Introducing Thumper," http://www.vibrantcomposites.com, 6 pages, 2015.

Israel Patent Office, International Searching Authority, International Search Report and Written Opinion, International Application No. PCT/US2017/054660, 10 pages, dated Jan. 18, 2018.

* cited by examiner

METHOD AND APPARATUS FOR IMPROVING MIXED REALITY SITUATIONAL AWARENESS

CROSS-REFERENCE TO RELATED APPLICATIONS

This application claims the benefit of U.S. Provisional Patent Application No. 62/402,673, filed Sep. 30, 2016, titled "Method and Apparatus for Improving Mixed Reality Situational Awareness," the entire contents of which are hereby incorporated by reference herein, for all purposes.

TECHNICAL FIELD

The present invention relates to systems and methods for presenting humanly imperceptible information to a human, such that the information is layered over the real world and, more particularly, to such systems and methods that automatically select combinations of sensory modes of presentation so as to increase rate and accuracy of the information the human can absorb.

BACKGROUND ART

Humans use senses, such as hearing, sight, taste, smell and touch, to perceive and understand the real world. Human brains and nervous systems are capable of processing signals from all the senses, selecting important signals to pay attention to and ignoring unimportant signals, at least at information rates that are common in real-world situations.

Modern society has developed rich parallel virtual worlds, full of digital data. In some cases, the virtual worlds represent real or fictional environments in which people, animals or avatars reside and interact. Virtual reality ("VR") goggles are sometimes used to present a virtual world to a human user, however VR goggles occlude the real world from the human user. Some VR systems include a view of the real world in their displays. However, these views are rendered through the filter of the VR system, for example using the VR system's camera and image processing circuit, and are, therefore, necessarily different from what the human user would see with her own eyes. Similar goggles are used by pilots who control drone aircraft. Such goggles provide views of only the real world, albeit through the filter of the drone's camera.

In some cases, humanly-imperceptible data about real-world objects or environments is useful to "overlay" over the real world. Google glass head-mounted display displays information, such as weather forecasts, about a location in which a user wears the device, thereby providing an augmented reality ("AR") view of the real world. AR devices permit a human user to view the real world with her own eyes, but with digital data overlaid over the view of the real world.

However, in general, conventional VR and AR technologies have problems related to intermodal "distance" between the real world's presentation and the virtual (digital) world's presentation. The virtual world may be too conceptually far from the real world and, therefore, the virtual world may distract the user's attention from the real world. Indeed, some VR systems are designed to provide distracting entertainment. In other cases, the virtual world may be rendered too close and, therefore, occlude the real world, such as by masking it or making it confusing.

Humans often face situations in which useful digital information is available, but the humans are unable to absorb the information and effectively make decisions based on the information due to sensory or cognitive overload, such as in high-stress contexts, for example in combat. In some cases, a given sense, such as vision, needs to be dedicated to a high-priority task, such as driving a car, and is, therefore, not available to receive digital information, such as a text message or to read a briefing paper ahead of a meeting to which the user is driving. Although VR and AR systems are touted as tools for alleviating such information overload problems, conventional systems have failed to adequately do so.

SUMMARY OF EMBODIMENTS

An embodiment of the present invention provides a system for improving situational awareness by a human user. The system includes a first port and a second port. The first port is configured to receive a first stream of data from a first data source. Each first datum of the first stream of data represents respective information from the first data source. The second port is configured to receive a second stream of data, distinct from the first stream of data, from a second data source. Each second datum of the second stream of data represents respective information from the second data source.

The system includes at least two human interface devices. Each human interface device of the at least two human interface devices is configured to stimulate a different respective sense of the human user. The system also includes a data presentation mapper. As the first stream of data is received and as the second stream of data is received, the data presentation mapper is configured to, automatically select, for each first datum, a respective first combination of human interface devices from among the at least two human interface devices. The data presentation mapper is also configured to automatically select, for each second datum, a respective second combination of human interface devices from among the at least two human interface devices. The data presentation mapper is also configured to coordinate each selection of the respective first combination of human interface devices with each selection of the respective second combination of human interface devices. The data presentation mapper is also configured to present each first datum via the respective first combination of human interface devices. The data presentation mapper is also configured to present each second datum via the respective second combination of human interface devices.

The first stream of data and the second stream of data may each represent information that is imperceptible by unaided human senses of the human user observing the real world.

The first stream of data may represent information about a vehicle.

A least one human interface device of the at least two human interface devices may be configured to allow the human user to directly perceive the real world using the respective sense of the human user.

The at least two human interface devices may include at least three human interface devices. Each human interface device of the at least three human interface devices may be configured to stimulate a different respective sense of the human user.

Each human interface device of the at least three human interface devices may be configured to generate one respective different kind of stimulus: a visual stimulus to a receptor cell, an auditory stimulus to a receptor cell, a thermal stimulus to a receptor cell, a torque stimulus to a receptor cell, a tactile stimulus to a receptor cell, an olfactory stimulus to a receptor cell, a taste stimulus to a receptor cell, a stimulus delivered directly to a nerve without an intervening receptor cell or a stimulus delivered directly to a central nervous system without an intervening receptor cell.

At least one human interface device of the at least three human interface devices may be configured to be worn by the human user.

Each human interface device of the at least three human interface devices may be configured to be worn by the human user.

Each human interface device of the at least three human interface devices may be configured to generate at least two different types of stimuli of the respective kind of stimulus. The at least two different types of stimuli may be configured to be perceived differently by the human user. For each first datum, for each human interface device of the first combination of human interface devices, the data presentation mapper may be configured to automatically select a respective first type of stimulus from among the at least two different types stimuli of the respective human interface device and generate, via the respective human interface device, a stimulus of the selected respective first type. For each first datum, for each human interface device of the first combination of human interface devices, the data presentation mapper may also be configured to select, for each second datum, for each human interface device of the second combination of human interface devices, a respective second type of stimulus from among the at least two different types stimuli of the respective human interface device and generate, via the respective human interface device, a stimulus of the selected respective second type.

At least one human interface device of the at least three human interface devices may be configured to generate a thermal stimulus. The at least two different types of stimuli include at least two of: a steady temperature greater than about 34° C., a steady temperature less than about 34° C. and a temperature that changes over time from a first predetermined temperature to a second predetermined temperature.

Each first combination of human interface devices may include at least zero human interface device of the at least three human interface devices, and each second combination of human interface devices may include at least zero human interface device of the at least three human interface devices.

Each first combination of human interface devices may include at least one human interface device of the at least three human interface devices, and each second combination of human interface devices may include at least one human interface device of the at least three human interface devices.

Each first combination of human interface devices may include at least two human interface device of the at least three human interface devices, and each second combination of human interface devices may include at least two human interface device of the at least three human interface devices.

Each first combination of human interface devices may include at least three human interface device of the at least three human interface devices, and each second combination of human interface devices may include at least three human interface device of the at least three human interface devices.

The at least two human interface devices may include at least four human interface devices. Each human interface device of the at least four human interface devices may be configured to stimulate a different respective sense of the human user.

The data presentation mapper may be configured to automatically select the first and second combinations of human interface devices based on a set of rules.

The system may also include a third port configured to receive information about a physical environment of the human user. The set of rules may include a rule related to the physical environment of the human user.

The information about the physical environment may include information about an ambient sound level in the physical environment. The set of rules may include a rule that causes automatic presentation of data from a given data source by a human interface device, other than a human interface device configured to generate an auditory stimulus, when: (a) the ambient sound level is greater than a predetermined level and (b) data from the given data source was previously presented, within a predetermined amount of time, by a human interface device configured to generate an auditory stimulus.

The information about the physical environment may include information about operational status of the at least two human interface devices. The set of rules may include a rule that automatically ceases presentation of data by a first human interface device of the at least two human interface devices and automatically selects another human interface device of the at least two human interface devices, when the operational status indicates the first human interface device has malfunctioned.

The data presentation mapper may be configured to automatically determine interruptability of the human user. The set of rules may include a rule that causes automatic delay of presentation of at least some data when the interruptability of the human user exceeds a predetermined value.

The system may also include a fourth port. The fourth port may be configured to receive information about a physiological state of the human user. The set of rules may include a rule related to the physiological state of the human user.

The physiological state of the human user may include a cognitive load level of the human user.

The data presentation mapper may be configured to automatically generate, for each datum of the first datum and the second datum, a list of information/presentation pairs. Each information/presentation pair may correspond to the datum and to a human interface device, of the at least two human interface devices, capable of presenting the datum. The data presentation mapper may be configured to automatically determine, for each information/presentation pair, a matching score indicative of desirability of presenting the corresponding datum by the corresponding human interface device. Selection of each first combination of human interface devices and each second combination of human interface devices may be based, at least in part, on the matching score exceeding a predetermined value.

Each datum may have a corresponding confidence level. The selection of each first combination of human interface devices and the selection of each second combination of human interface devices may be based, at least in part, on the confidence level of the corresponding datum exceeding a predetermined value.

The data presentation mapper may be configured to automatically determine, for each information/presentation pair, a benefit score, as a function of the matching score and the confidence level. The data presentation mapper may be configured to automatically select, from the list of information/presentation pairs, information/presentation pairs that have respective benefit scores greater than a predetermined value, thereby selecting a plurality of information/presentation pair candidates. The data presentation mapper may be configured to automatically generate a plurality of combinations of at least two of the information/presentation pair candidates. The data presentation mapper may be configured to automatically determine, for each combination of the at least two of the information/presentation pair candidates, a combination benefit score. The selection of each first combination of human interface devices and the selection of each second combination of human interface devices may be based, at least in part, on the combination benefit score exceeding a predetermined value.

The data presentation mapper may be configured to automatically determine, for each information/presentation pair candidate and for each combination of at least two information/presentation pair candidates, an opportunity cost to the system to present the respective information/presentation pair candidate and the respective combination of at least two information/presentation pair candidates. The data presentation mapper may be configured to automatically determine, for each information/presentation pair candidate and for each combination of at least two information/presentation pair candidates, a cognitive cost to the user to receive the respective information/presentation pair candidate and the respective combination of at least two information/presentation pair candidates. The data presentation mapper may be configured to automatically compare, for each information/presentation pair candidate and for each combination of at least two of the information/presentation pair candidates: (a) a combination of the respective opportunity cost and the respective cognitive cost to (b) the respective benefit score or combination benefit score, as the case may be, thereby performing a cost/benefit comparison. The selection of each first combination of human interface devices and the selection of each second combination of human interface devices may be based, at least in part, on benefit exceeding cost in the cost/benefit comparison.

Another embodiment of the present invention provides a method for improving situational awareness by a human user. The method includes receiving, via a first port, a first stream of data from a first data source. Each first datum of the first stream of data represents respective information from the first data source. A second stream of data, distinct from the first stream of data, is received, via a second port, a from a second data source. Each second datum of the second stream of data represents respective information from the second data source.

At least two human interface devices are provided. Each human interface device of the at least two human interface devices is configured to stimulate a different respective sense of the human user. As the first stream of data is received and as the second stream of data is received, for each first datum, a respective first combination of human interface devices is automatically selected from among the at least two human interface devices. For each second datum, a respective second combination of human interface devices is automatically selected from among the at least two human interface devices. Each selection of the respective first combination of human interface devices is coordinated with each selection of the respective second combination of human interface devices. Each first datum is presented via the respective first combination of human interface devices. Each second datum is presented via the respective second combination of human interface devices.

Yet another embodiment of the present invention provides a non-transitory computer-readable medium. The medium is encoded with instructions. When the instructions are executed by a processor, the instructions establish processes for performing a computer-implemented method of improving situational awareness by a human user. The processes include a process configured to receive, via a first port, a first stream of data from a first data source. Each first datum of the first stream of data representing respective information from the first data source. The processes also include a process configured to receive, via a second port, a second stream of data, distinct from the first stream of data, from a second data source. Each second datum of the second stream of data represents respective information from the second data source. The processes also include a process configured to control at least two human interface devices. Each human interface device of the at least two human interface devices is configured to stimulate a different respective sense of the human user. The processes also include a process configured, as the first stream of data is received and as the second stream of data is received, to automatically select, for each first datum, a respective first combination of human interface devices from among the at least two human interface devices. A process is configured to automatically select, for each second datum, a respective second combination of human interface devices from among the at least two human interface devices. A process is configured to automatically coordinate each selection of the respective first combination of human interface devices with each selection of the respective second combination of human interface devices. A process is configured to automatically present each first datum via the respective first combination of human interface devices. A process is configured to automatically present each second datum via the respective second combination of human interface devices.

BRIEF DESCRIPTION OF THE SEVERAL VIEWS OF THE DRAWING

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for improving decision making speed of a human user by presenting data to the user in ways that enable the user to receive the data at higher rates, and spend more time analyzing received data, than conventionally. The data may represent information, such as infrared imagery, a geographic information system (GIS) map or digital terrain elevation data (DTED), that is not directly perceivable by the human user. An individual datum may be presented to the user via multiple senses, to make receiving the datum easier, and to make it more likely that the datum is received over at least one of the multiple senses and recognized by the user, especially in contexts where the user may be busy, stressed, cognitively loaded or distracted by other demands on the user's attention.

Some embodiments automatically select which sense or combination of senses to use for presenting each datum, based on various factors, such as how the user's current environment, for example noise, may interfere with the user's ability to receive or process the datum or how busy a given sense is attending to another important task. Some embodiments perform a cost/benefit analysis when selecting whether to present a given datum or when selecting a subset of data to present. If a decision is made to present a datum, some embodiments perform a cost/benefit analysis when selecting which sense or combination of senses to use for the presentation. Some embodiments automatically detect a level of cognitive load and/or sensory load on the user, or interruptability of the user, and delay presenting a datum when the detected level indicates the user is unlikely to be able to currently receive or process the datum. Embodiments enable a human user to be better aware of the user's situation than previously.

Perception and Cognition

Perception, as used herein, refers to a human detecting an external signal, such as sound, light, touch or a chemical (for smell or taste) with a receptor cell and sending a corresponding signal via a nerve to a central nervous system. On the other hand, cognition, as used herein, means understanding perceived information, including transforming low-level information to higher-level information, such as extracting shapes for object recognition, and processing the higher-level information, such as in connection with a person's concepts, expectations or knowledge.

Figure 1:
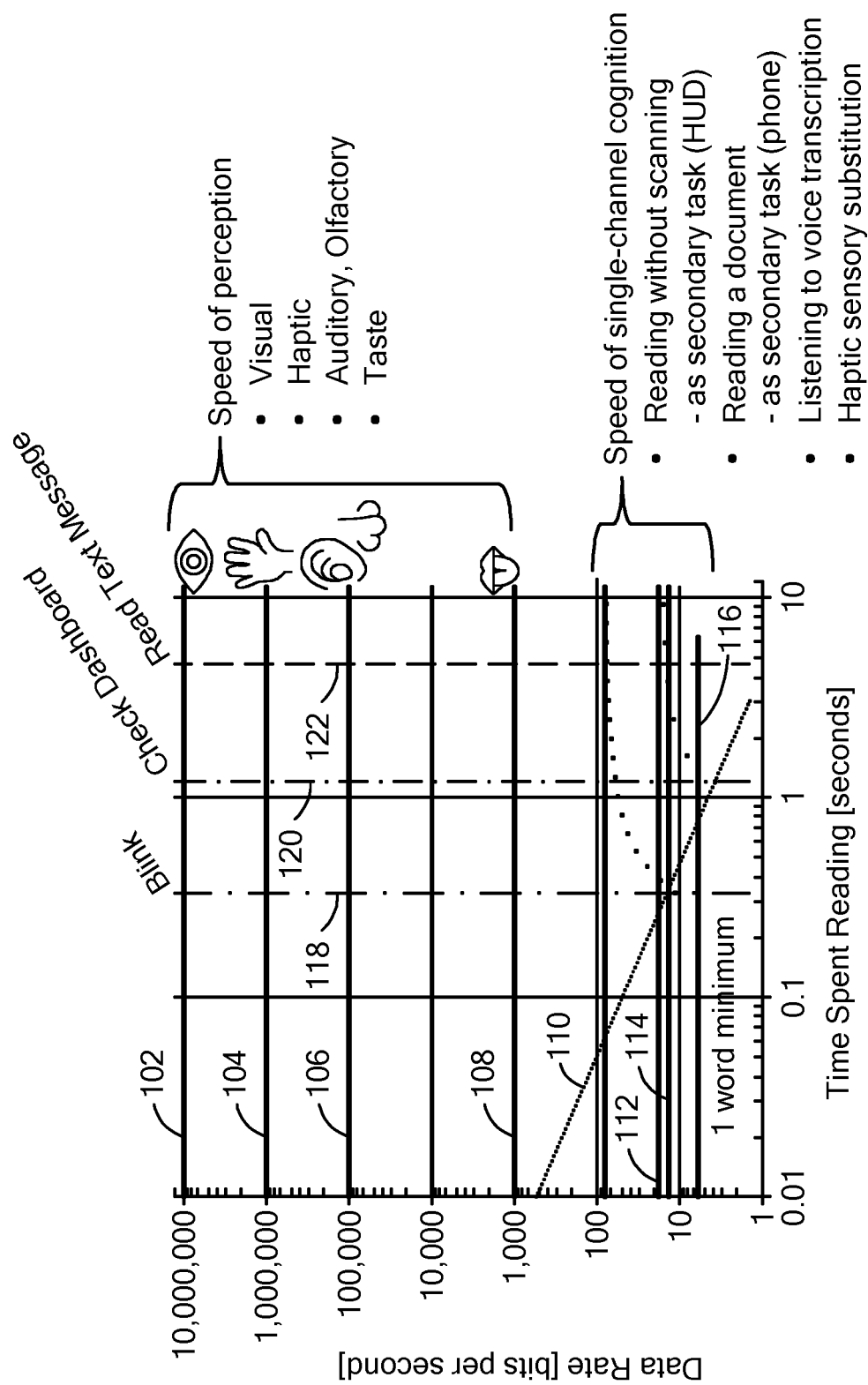
FIG. 1 is a chart showing relative rates at which a human is capable of perceiving information, versus amounts of time spent receiving the information, for various modes of receiving the information, including visually, haptically, auditorily or olfactorily or via a taste sensation.

FIG. 1 is a chart showing relative rates at which a human is capable of perceiving information, versus amounts of time spent receiving the information, for various modes of receiving the information, including visually 102, haptically 104, auditorily or olfactorily 106 or via a taste sensation 108. FIG. 1 shows that perception is fastest for visually-perceived data 102, followed by haptically-perceived data 104, auditorily-perceived or olfactorily-perceived data 106 and taste-perceived data 108.

FIG. 1 also shows a human's data rate of cognition of textual information, i.e., understanding perceived textual information, for several exemplary modes of perceiving the information via a single sense (single channel). Line 110 represents reading without scanning, such as perceiving the information on a heads-up display (HUD) as a secondary task while performing a primary task, such as driving a vehicle. Line 112 represents reading a document as a secondary task, while performing a primary task, such talking on a telephone. Line 114 represents listening to a voice transcription, and line 116 represents using a haptic sensory substitute, such as an electro-mechanical braille terminal. As can be seen in FIG. 1, single-channel cognition rates 110-116 are much lower than single-channel perception rates 102-108.

FIG. 1 also shows times for exemplary human activities, such as blinking of an eye 118 (about 0.6 seconds), checking a dashboard of a vehicle 120 (a little more than about 1 second) and reading a text message 122 (usually more than about 5 seconds).

As can be seen from FIG. 1, human senses are relatively fast, whereas human decision making is relatively slow. We recognized that perception rates are not bottlenecks to cognition, and that unused sensory bandwidth may be used to provide information through several senses in parallel to several parts of the brain, thereby distributing cognitive workload across more parts of the brain, leading to increased cognitive speed. When information is presented to a human via a combination of senses, the speed of cognition generally increases. Experimental psychology literature indicates that presenting information across several sensory channels, such as visual and auditory, can provide an approximately six-times gain in human decision making.

Human Interface Devices

Figure 2:
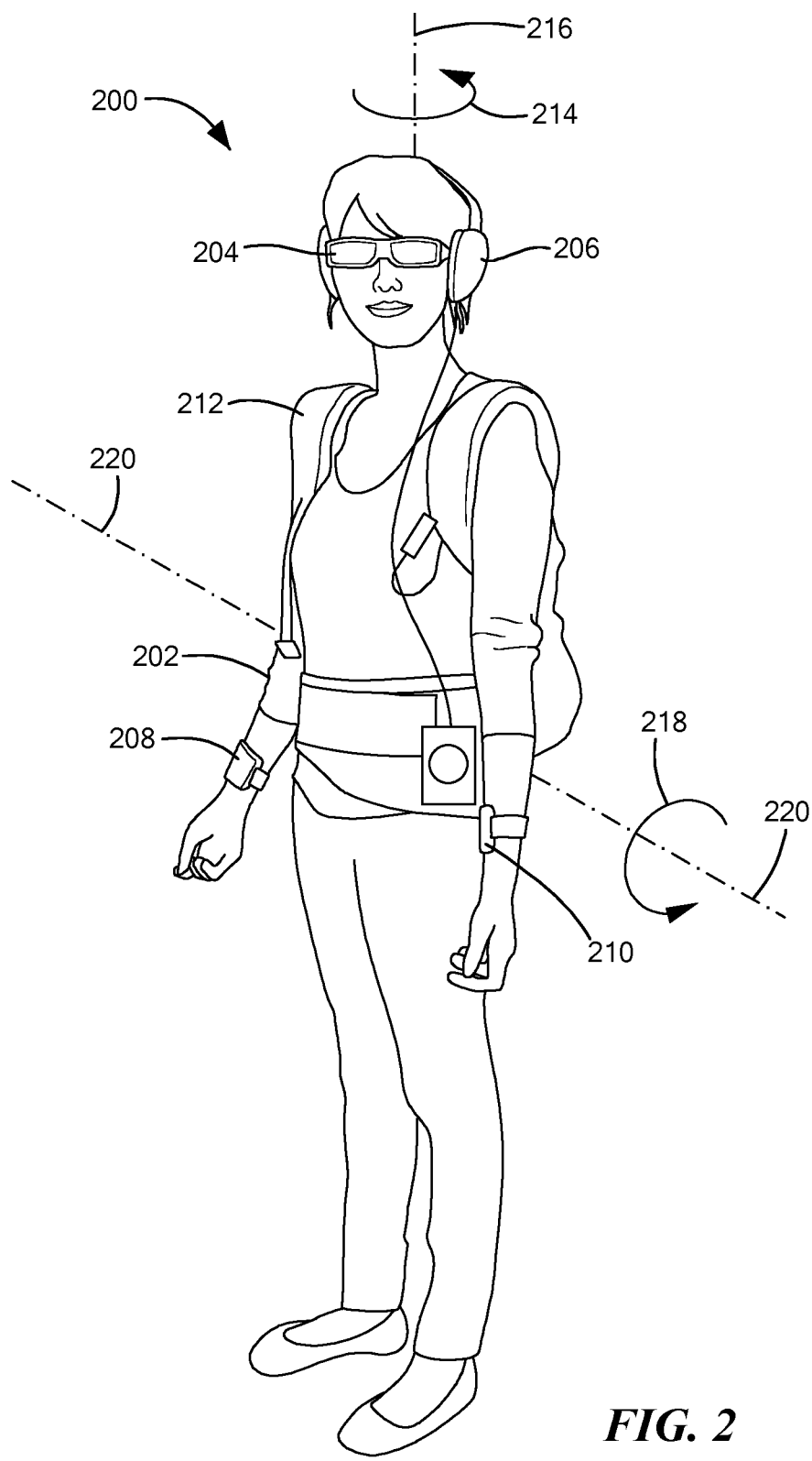
FIG. 2 is an illustration of one exemplary combination of wearable human interface devices being used by a human user, according to an embodiment of the present invention.

As noted, embodiments of the present invention present information to a human user via multiple senses. Various combinations of human interface devices (HIDs) are used to present the information. Each human interface device is capable of generating a respective different kind of stimulus and, therefore, stimulating a different human sense. FIG. 2 is an illustration of one exemplary combination 200 of wearable human interface devices being used by a human user 202. The combination 200 includes a heads-up display (HUD) 204, 3D headphones 206, thermal sense generators 208 and 210 and a tactile/torque sense generator 212. Although each human interface device 204-212 of the combination 200 shown in FIG. 2 is wearable by a human, other combinations may include non-wearable human interface devices. For example, stereophonic, quadraphonic or 3D loudspeakers (not shown) mounted in a vehicle may be used as a human interface device.

The heads-up display 204 provides a visual presentation to the human user 202. The heads-up display 204 may be configured to display text and/or graphics, in monochrome or color, in 2D or 3D, as needed. For example, the head-up display 204 may display a topographic map registered with the direction in which the human user 202 is gazing, such that the human user 202 sees the real word directly, with the map overlaid on top of the real-world view. The head-up display 204 may display a steady red light or a blinking light to attract the human user's attention, such as to indicate a motor of a vehicle being occupied or driven by the human user 202 has overheated or to indicate proximity of a detected obstacle or enemy soldier.

In addition to, or instead of, the aforementioned light, the heads-up display 204 may display an arrow indicating a direction toward an object of interest, such as the motor, the obstacle or the enemy soldier. Optionally or alternatively, the heads-up display 204 may display an icon that represents motor overheat or other vehicle status, obstacle or enemy soldier. Optionally or alternatively, the heads-up display 204 may display may display text, such as current motor temperature and safe operating temperature. The heads-up display 204 may display size, direction, distance to and/or composition of the obstacle, using text and/or icons. Similarly, the heads-up display 204 may display direction, distance to and/or number of the enemy solder(s). The heads-up display 204 may display a computer-generated image of a compass, an arrow that represents a compass direction or a suggested direction of travel.

Any of the information displayed by the head-up display 204 may be color coded and/or the heads-up display 204 may provide a stereoscopic (3D) image to the human user 200. The heads-up display 204 may simultaneously or sequentially display information about several different items. Although all the information the heads-up display 204 displays is visual, the heads-up display 204 may use several different types of visual stimuli that are each perceived differently by the human user 200. For example, different colors are perceived differently by the human user 200. Similarly, different shapes, text versus graphics, and images displayed in different portions of the human user's field of vision are perceived differently. With a stereoscopic (3D) heads-up display, apparent distance to an image may be used to distinguish between images having different types of stimuli. For example, an apparently near object may represent a more important object than an apparently distant object. The term "widget" is used herein to identify a given type of stimuli, within a single human sense. Thus, for example, different widgets may have different colors, and color may be used to distinguish between different widgets. Suitable heads-up displays are available from Epson, ODG, Microsoft and many other sources.

The headphones 206, or loudspeakers (not shown) mounted in a vehicle or elsewhere, provide an auditory presentation to the human user 202. Although examples with headphones are described, loudspeakers may be used instead, with appropriate modifications. The headphones 206 may be monaural, stereophonic, quadraphonic or 3D. The headphones may be used to play sounds as auditory icons, i.e., sonic equivalents to visual icons, that is, sounds that represent concepts, such as attention, motor overheat, obstacle or enemy soldier. Examples of auditory icons include a ping, a tone with steady pitch, a tone with decreasing pitch over time, a tone with increasing pitch and a tone with increasing volume. The headphones 206 may be used to play prerecorded audio, such as recorded speech of a human, synthesized speech, music or other sounds.

As with the heads-up display 204, although all the information presented by the headphones 206 is auditory, the headphones 206 can present several different types of auditory stimuli (widgets) that are each perceived differently by the human user 200. Each of the previously described auditory icons is an example of a different type of auditory stimulus. Other examples of different types of auditory stimuli include speech versus tone; apparent direction to source of a sound generated by stereophonic, quadraphonic or 3D headphones; male versus female voice of spoken or synthesized speech; and relative volume of sounds. Examples of suitable headphones include OSSIC X and headphones in helmets used in modern United States Air Force fighter jets.

The thermal sense generators 208 and 210 provide thermal presentations to the human user 202. Each thermal sense generator 208 and 210 generates heat or cooling, relative to normal human skin temperature of about 34° C., and applies the heat or cooling to the skin of the human user 202, either directly or through clothing. The human user 202 senses the heat or cooling. Suitable thermal sense generators are available from Embr Labs, Cambridge, Mass.

Although originally designed to physiologically trick a body into feeling more temperature-comfortable by heating or cooling only a small portion of a human body, such as wrists, we realized such devices can be used as human interface devices. By controlling the thermal sense generators 208 and 210 by a processor or other suitable circuit, the processor or suitable circuit can send information to the human user 202. For example, cooling the right wrist with the thermal sense generator 208 to below normal skin temperature for a brief period of time, such as about 2 seconds, sends a "cold thermal tap" stimulus to the human user 202, which may be designated to attract the human user's attention or to indicate an enemy soldier has been detected to the right of the human user 202. Similarly, a cold thermal tap on the left wrist generated by the other thermal sense generator 210 may be designated to indicate an enemy soldier has been detected to the left of the human user 202.

Similarly, heating a wrist with one of the thermal sense generators 208 or 210 to above normal skin temperature for a brief period of time, such as about 2 seconds, sends a hot thermal tap stimulus to the human user 202, and may be designated to indicate the enemy soldier is no longer detected. Changing the temperature of one of the thermal sense generators 208 or 210 from a first predetermined temperature, such as a temperature below normal skin temperature, to a second predetermined temperature, such as a temperature above normal skin temperature, over a brief period of time, such as about 2 seconds, sends a "cold-to-hot ramp" stimulus to the human user 202, and may be designated to have a predefined meaning, in terms of information to the human user 202. Similarly, a hot-to-cold ramp may have another designated meaning.

Although one thermal sense generator 208 or 210 is shown on each wrist of the human user 202, thermal sense generators (not shown) may be worn on other parts of the human user's body, such as on the lower arms, upper arms, ankles, legs, calves, neck, chest or back. Although two thermal sense generators 208 or 210 are shown, any number of thermal sense generators may be worn by the human user 202.

As with the heads-up display 204 and headphones 206, although all the information presented by the thermal sense generators 208 or 210 is thermal, the thermal sense generator 208 or 210 can present several different types of thermal stimuli (widgets) that are each perceived differently by the human user 200. Examples include heat versus cold, left versus right side of body, body part on which the thermal sense generator 208 or 210 is worn, constant temperature (such as thermal tap) versus thermal ramp, number of successive thermal taps in rapid succession, and direction of a thermal ramp (i.e., increasing versus decreasing temperature). Coded messages can be sent, albeit at a relatively low data rate, to the human user 202 by modulating the temperature of one or more of the thermal sense generators 208 or 210, such as using Morse code.

The torque/tactile sense generator 212 provides a torque and/or tactile presentation to the human user 202. The torque/tactile sense generator 212 may be worn, such that torque and/or vibration generated by the torque/tactile sense generator 212 is transferred to the human user 202 through physical contact with the human user's back, waist or other suitable location. A suitable torque sense generator is described in U.S. Pat. Publ. No. 2014/0260714 ("Gyroscopic-assisted device to control balance"), the entire contents of which are hereby incorporated by reference herein, for all purposes, and available from The Charles Stark Draper Laboratory, Inc., Cambridge, Mass. Although the device described in the aforementioned U.S. patent application publication is designed to detect pre-fall conditions of a user and control gimbal and spin actuators to produce a control moment required to prevent the fall, we realized such a device can be used as a human interface device. By controlling the gimbal and spin actuators by a processor or other suitable circuit, the processor or other circuit can send information to the human user 202.

For example, the gimbal and spin actuators may be operated by the computer to apply a torque to the body of the human user 202. A torque that urges the human user 202 to twist toward the left, as indicated by arrow 214, about a longitudinal axis 216, may, for example, be used to indicate to the human user 202 that a threat, such as an enemy soldier or other object or event to which the human user 202 should pay attention, has been detected to the left of the human user 202. A torque that urges the human user 202 to twist forward, as indicated by arrow 218, about a horizontal axis 220, may, for example, be used to indicate to a dismounted human user 202 that a low-hanging obstacle, such as a branch, has been detected, such as by a body-worn infrared camera, radar, LiDAR or sonar system, and that the human user 202 should bend or crouch down to avoid the obstacle. In another context, a torque that urges the human user 202 to twist forward 218 may be used to draw attention of the human user 202 to a dashboard of a vehicle the human user 202 is driving or occupying, and a torque that urges the human user 202 to twist backward may be used to draw attention of the human user 202 to a windshield of the vehicle, so the human user 202 looks outside the vehicle. Similar torque sense generators (not shown) may be worn on arms or legs to apply torques to these limbs to convey other information.

As with the heads-up display 204, headphones 206 and thermal sense generators 208 and 210, although all the information presented by the torque sense generator is torque, the torque sense generator can present several different types of torque stimuli (widgets) that are each perceived differently by the human user 200. Examples include left versus right torque about the longitudinal axis 216, and front versus back torque about the horizontal axis 220.

Instead of, or in addition to, torque, the torque/tactile sense generator 212 can generate tactile (touch/haptic) presentations to the human user 202. Examples of tactile presentations include vibrations (similar to those produced by vibrators in mobile telephones) that include a plurality of cycles of physical movement, "taps" that include a single cycle of physical movement, and pressure applied for a predetermined period of time, such as about 1-2 seconds. Although the torque/tactile sense generator 212 is shown as being worn on the back and around the waist of the human user 202, one or more tactile sense generators (not shown) may be worn on various parts of the human user's body, such as wrists, lower arms, upper arms, ankles, legs, calves, neck, chest or back.

As with the other human interface devices 204-210, although all the information presented by the tactile sense generator is tactile, the tactile sense generator can present several different types of tactile stimuli (widgets) that are each perceived differently by the human user 200. Examples include a short vibration, such as less than about ¼ second in duration; a long vibration, such as greater than about ¾ second in duration; a single tap; and a series of taps that are individually detectable (countable) by the human user 202.

Although not shown in FIG. 2, other examples of human interface devices include olfactory sense generators that chemically stimulate olfactory receptor cells in the human user's nose, and taste sense generators that chemically stimulate taste receptor cells on the human user's tongue. An olfactory sense generator can present several different types of olfactory stimuli (widgets) that are each perceived differently by the human user 200. Examples include baking cake, ocean air, fresh flowers and fish and chips. A taste sense generator can present several different types of taste stimuli (widgets) that are each perceived differently by the human user 200. Examples include sweet, sour, salty, bitter, pungent and astringent.

According to Wikipedia ("Somatosensory system"), the somatosensory system is a part of the sensory nervous system. The somatosensory system is a complex system of sensory neurons and pathways that responds to changes at a surface or inside the body. Axons, as afferent nerve fibers, of sensory neurons connect with, or respond to, various receptor cells. These sensory receptor cells are activated by different stimuli, such as heat or pressure, giving a functional name to a responding sensory neuron, such as a thermoreceptor, which carries information about temperature changes. Other types include mechanoreceptors, chemoreceptors, and nociceptors, and they send signals along a sensory nerve to the spinal cord, where they may be processed by other sensory neurons and then relayed to the brain for further processing. Sensory receptors are found all over the body, including the skin, epithelial tissues, muscles, bones and joints, internal organs and the cardiovascular system.

Somatic senses are sometimes referred to as somesthetic senses, with the understanding that somesthesis includes the sense of touch, proprioception (sense of position and movement) and, depending on usage, haptic perception.

Although not shown in FIG. 2, other examples of human interface devices include sense generators that interface directly with nerves, without intervening receptor cells, or that interface directly with a central nervous system, without intervening receptor cells. For example, a human interface device may interface directly with nerves through an array of microelectrodes, as described in U.S. Pat. Publ. 2015/0216682 ("Array of microelectrodes for interfacing to neurons within fascicles"), the entire contents of which are hereby incorporated by reference herein, for all purposes. A human interface device may interface directly with a central nervous system through an array of implanted microelectrodes, implanted optical fibers or through magnetic stimulation, such as from a stimulator external to the head of the human user 202.

As noted, the term "widget" is used herein to identify a given type of humanly distinguishable stimulus, within a single human sense. Thus, for example, different widgets may have different colors, different temperatures, different torque directions or different frequencies. Color, temperature, torque direction or frequency may be used to distinguish between different widgets.

Combinations of Human Interface Devices

Figure 3:
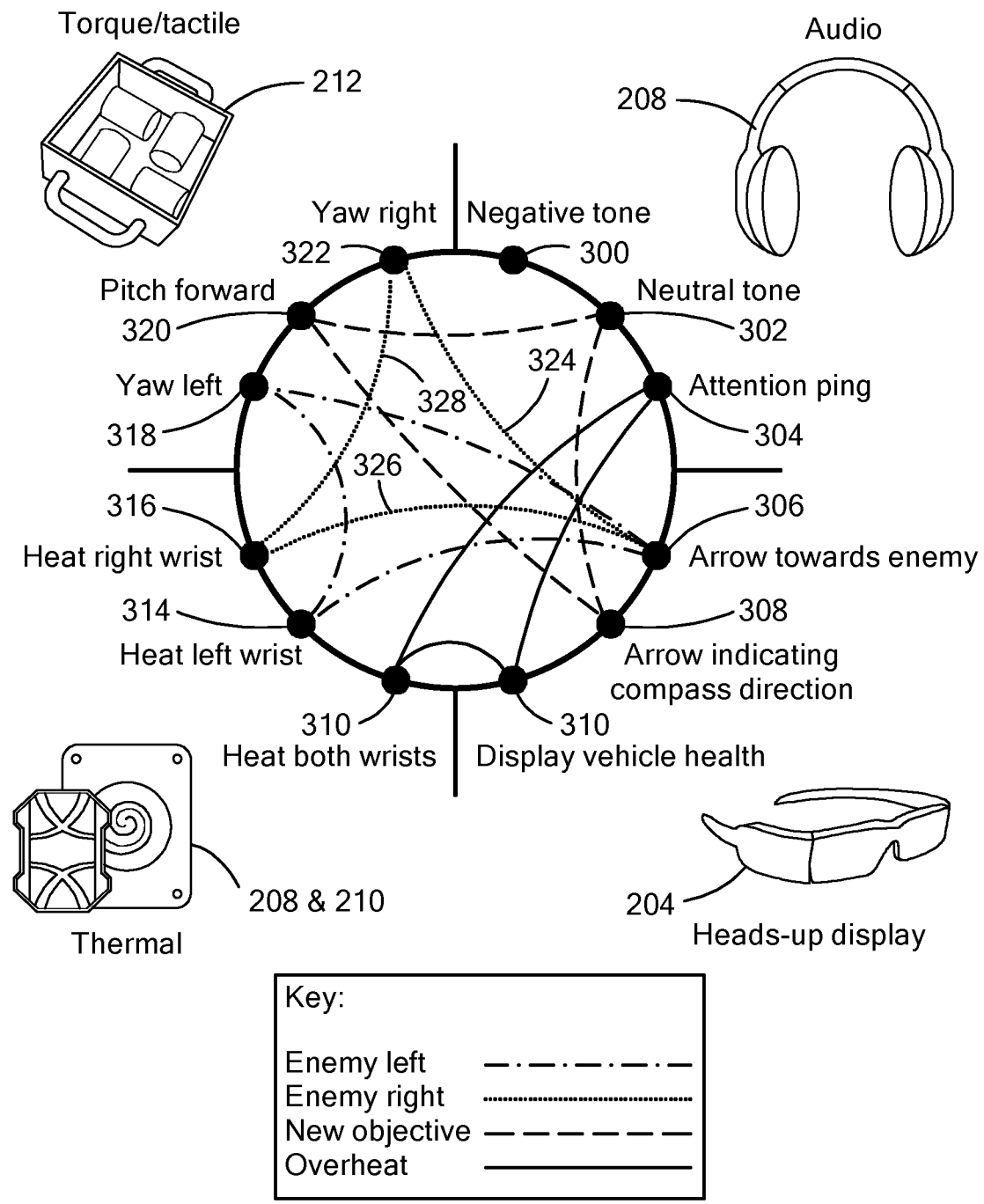
FIG. 3 schematically illustrates a hypothetical exemplary combination of human interface devices that may be used in combination, according to an embodiment of the present invention.

As noted, embodiments of the present invention present information to a human user via multiple senses, and various combinations of human interface devices are used to present the information. FIG. 3 schematically illustrates a hypothetical exemplary combination of human interface devices 204-212 that may be used in combination, for example as shown in FIG. 2, although other numbers of human interface devices and other combinations of human interface devices may be used.

Each human interface device 204-212 is configured to generate a respective different kind of stimulus, i.e., to stimulate a different respective sense of the human user 202 (FIG. 2). In addition, each human interface device 204-212 is configured to generate at least two different types of stimuli (widgets) of the respective kind of stimulus generated by the human interface device. For example, the headphones 206 may be configured to generate a "negative/ warning tone" 300, such as a harsh buzzer sound; a neutral tone 302, such as a click sound; and an attention ping 304. The heads-up display 204 may be configured to generate an arrow 306 pointing toward an enemy, an arrow 308 indicating compass direction and a vehicle health (mechanical status), such as via an icon or text display. The thermal sense generators 208 and 210 may be configured to generate heat on both wrists 312, heat on the left wrist 314 and heat on the right wrist 316. The torque/tactile sense generator 212 may be configured to generate a yaw left 318, a forward pitch 320 and a yaw right 322. Thus, each type of stimuli 300-322 may be considered to be a different widget.

As indicated by various lines, exemplified by lines 324, 326 and 328, that interconnect groups of types (widgets) of stimuli 300-322, a given piece of information may be conveyed to the human user 200 using a combination of stimuli types (widgets) across the combination of human interface devices. For example, an indication that an enemy has been detected may be indicated on the heads-up display 204 with an arrow 306 pointing toward the enemy, by a yaw left 318 or yaw right 322, depending on the direction of the enemy, and by heat on the left 314 or right 316 wrist, depending on the direction of the enemy. This combination of stimuli convey the information about the enemy through several senses and are, therefore, more easily and quickly understood by the human user 202. Furthermore, if one of the human user's senses, such as sight, is overloaded with other tasks, such as steering a vehicle, the information about the enemy is, nonetheless, conveyed to the human user 202 via the other senses.

Each interconnected (by lines) group of stimuli types (widgets) 300-322 may represent a different message or information to be conveyed to the human user 202. Combinations of stimuli types 300-322, other than the ones shown by lines in FIG. 3, may also be used to convey other messages or information. In some cases, a single connected group of stimuli 300-322 may be used to convey more than one different message of information. For example, if one of the stimulus types (widgets) is graphical icon displayed on the heads-up display 204, many different graphical icons may be used, each in relation to a different message or information, even if the same thermal and torque/tactile stimulus types are used in conjunction with each of the messages or information. Although three widgets 300-304, 306-310, 312-316 and 318-322 are shown for each human sense, other numbers of widgets 300-322 may be used for each sense. All the senses need not necessarily have the same number of widgets. Although each different message or information is conveyed using a triple of widgets in FIG. 3, other numbers of widget-tuples may be used.

Data Presentation Mapping

Figure 4:
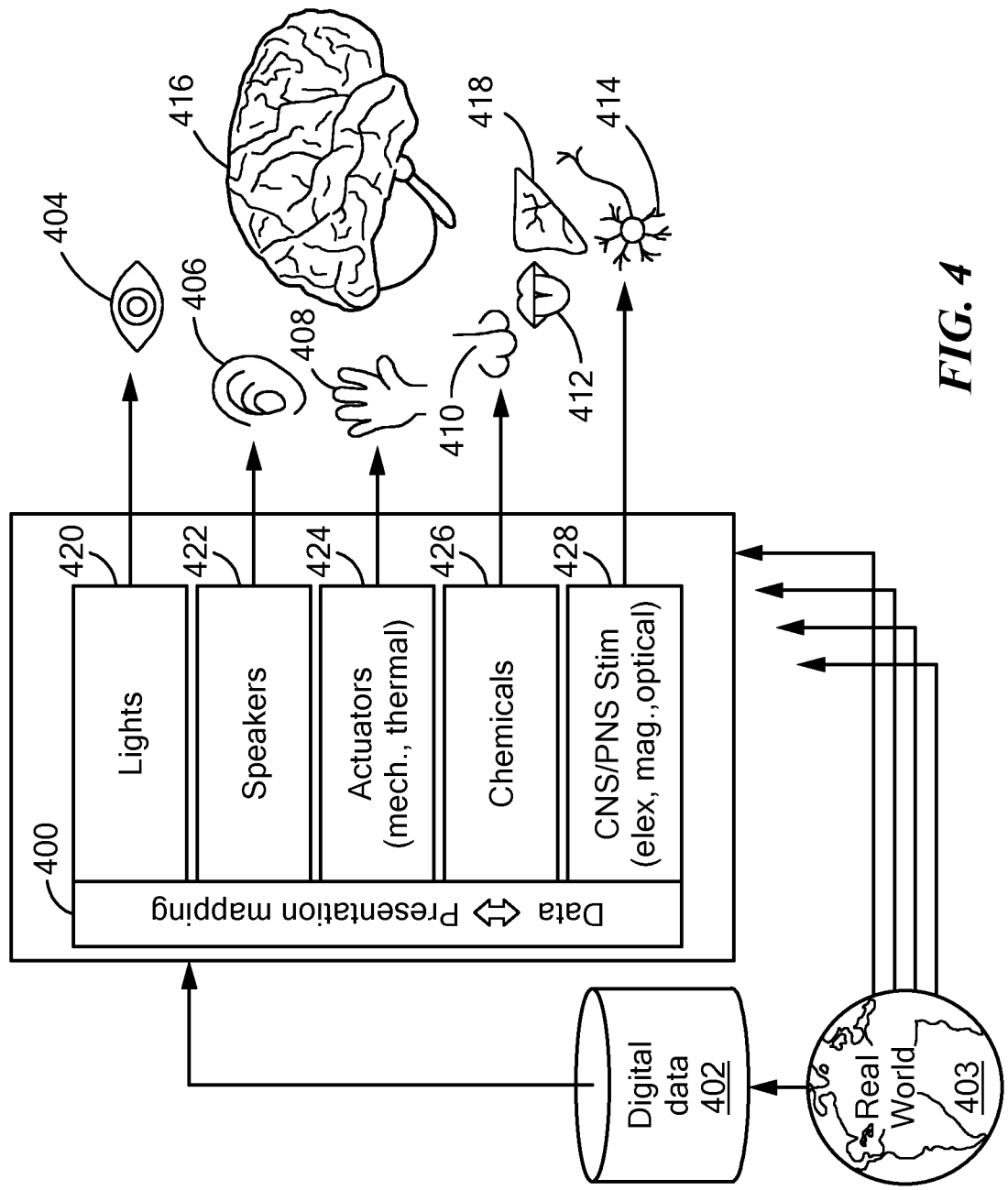
FIG. 4 schematically illustrates the mapping process of information from the digital world to a chosen combination of senses and widgets, according to an embodiment of the present invention.

Choosing which combination of human senses to use to convey a given piece of information, and choosing which widget for each chosen sense, is referred to herein as "mapping." FIG. 4 schematically illustrates the mapping process 400 of information from the digital world 402 to a chosen combination of senses and widgets.

Some or all of the information in the digital world 402 may have originated in the real world 403. For example, the digital world 402 may include GIS map data that was generated by measuring the real world 403, such as by satellites. Other examples of digital world data include status of a motor in a vehicle; direction and range to another vehicle or enemy soldiers as detected by an infrared camera, LiDAR or radar; and commands from headquarters, such as a new objective of a mission.

The senses may include vision 404, hearing 406, touch or torque 408, smell 410, taste 412, direct nerve stimulation 414 without an intervening receptor cell and direct central nervous system stimulation 416 without an intervening receptor cell. Although not traditionally considered a sense, stimulating a gland or other organ that triggers a physiological response that is detectable by the human user 202 may be used as a human interface device. For example, stimulating an appropriate endocrine gland causes releaser of hormones, such as epinephrine and norepinephrine, which can provide a burst of energy required for the body to respond to an emergency. Such a burst of energy could be used to convey to the human user 202 that a situation is critical.

The human interface devices may include lights 420, such as pixels in a heads-up display; speakers 422 or headphones; actuators 424, such as mechanical vibrators, torque generators or thermal generators; chemicals 426 for stimulating olfactory receptors cells, taste receptor cells or glands 418; and direct electrical, magnetic, optical or other stimulation 428 of nerves 414 or the central nervous system 416. As in FIGS. 1-3, several exemplary senses 404-418 and several exemplary human interface devices or human interface mechanisms 420-428 are shown. However, other numbers, and other combinations, of human interface devices or human interface mechanisms may be used.

Figure 5:
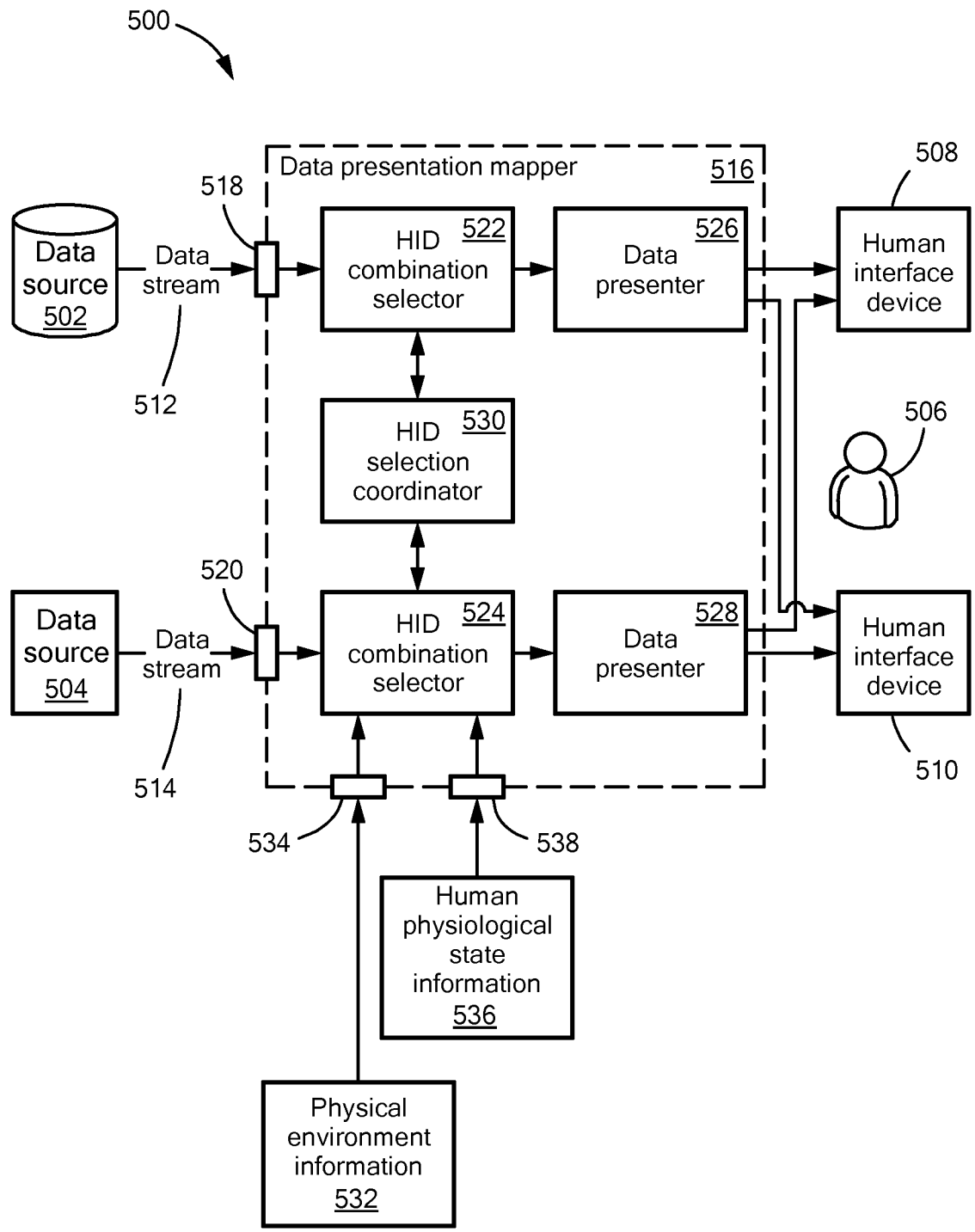
FIG. 5 is a schematic block diagram of a system for improving situational awareness by a human user, according to an embodiment of the present invention.

FIG. 5 is a schematic block diagram of a system 500 for improving situational awareness by a human user, according to an embodiment of the present invention. Two or more data sources, exemplified by data sources 502 and 504, provide information that is to be presented to a human user 506 via two or more human interface devices, exemplified by human interface devices 508 and 510. The data sources 502 and 504 correspond to the digital data 402 in FIG. 4. Each of the human interface devices 508 and 510 is configured to stimulate a different sense of the human user 506. For example, one of the human interface devices 508 may be a heads-up display, and the other human interface device 510 may be a pair of 3D headphones. Although only two data sources 502 and 504 and only two human interface devices 508 and 510 are shown for simplicity of explanation, any number of data sources and any number of human interface devices, such as three or four, may be used.

Each data source 502 and 504 may contain predefined data, such as map data, or data that is generated or sensed in real time or near real time, such as image data from an infrared camera worn by the human user 506, for example to facilitate inconspicuous nighttime operation outdoors. The data source 502 or 504 may be a model or a computer simulation. Examples of data sources 502 and 504 include communication systems for receiving orders from a command post; sensors installed in vehicles to monitor mechanical operation of the vehicles, such as engine temperature; and sensors on the vehicle in which the human user 506 rides or on remote vehicles, such as drones, that monitor the human user's environment, for example to detect enemy soldiers.

The data from the data sources 502 and 504 are not directly perceivable by a human. For example, digital data cannot be directly perceived by a human. Instead the data must be rendered, such as by a video display, heads-up display, printer, loudspeaker or plotter, to make it perceivable by a human. Although something that is directly perceivable by the human user 506, such as a scene in front of the human user 506, may be used to generate the data, for example if a video camera captures the scene and acts as one of the data sources 502 and 504, the data represents information different from what the human user 506 directly perceives by looking at the scene. For example, at least one of the dynamic light range of the camera, the camera's resolution, depth of field, focal length, field of view, etc. is different from that of the human user 506. Thus, necessarily, any digital data is imperceptible directly by the human user 506.

Each data source 502 provides a respective stream of data, exemplified by data streams 512 and 514. The term "stream" does not necessarily require that data be supplied continuously by the respective data source 502 or 504, only that more than one datum is supplied over time. In other words, the data source 502 or 504 may supply the data intermittently. In any case, each datum in the data stream 512 or 514 represents information from the respective data source 502 or 504. The term datum means a single piece of information provided by the data source 502 or 504, without limiting the amount of information in a single datum. For example, a datum can include a single bit, a single byte, a string of bytes, a single character, a string of characters of a message, a single number, a group of numbers, a portion of a map, an entire map, etc.

A data presentation mapper 516 receives the data streams 512 and 514 via respective ports 518 and 520. The ports 518 and 520, and other ports described herein, need not be physical ports, nor separate ports. For example, one or both data streams 512 and/or 514 may be received by the data presentation mapper 516 via a single wired, wireless or software computer network connection. The term port, as used herein, means a hardware or software component, by which the data presentation mapper 516 can receive data from the data sources 502 and 504 or other sources.

For each data stream 512 and 514, the data presentation mapper 516 includes a human interface device combination selector, exemplified by human interface device combination selectors 522 and 524. Although separate human interface device combination selectors 522 and 524 are shown, a single human interface device combination selector may service all the data streams 512-514, such as on a round-robin or priority basis. For each datum received from the data stream 512 or 514, the human interface device combination selector 522 or 524 selects a combination of the human interface devices 508 and 510. For each datum received from the data stream 512 or 514, the human interface device combination selector 522 or 524 also selects which type of stimulus (widget) is to be used on each selected human interface device 508-510 to present the datum.

The selected combination of human interface devices 508-510 present the received datum to the human user 506. Respective data presenters 526 and 528 drive the respective human interface devices 508 and 510.

A human interface device selection coordinator 530 coordinates the selections of the combinations of human interface devices selected by the human interface device combination selectors 522 and 524. Thus, the human interface device combination selectors 522 and 524 do not operate independently of each other. Selections made by one of the human interface device combination selectors 522 or 524 influence selections made by the other human interface device combination selector 522 or 524, for example because presenting a datum from one of the data streams 512 on one of the human interface devices, for example human interface devices 508, presents a sensory load on the human user 506, in particular, a sensory load on the sense that is stimulated by the human interface device 508, and this sensory load reduces the human user's ability to perceive and understand a datum from the other data stream 514, if that datum were also to be presented to the human user 506 by the same human interface device 508. Furthermore, each human interface device 508-510 has a limited capacity to present information.

Thus, the human interface device combination selectors 522 or 524 and the human interface device selection coordinator 530 keep track of the data streams 512-514, and therefore corresponding presentation streams being presented to the human user 506 on the various human interface devices 508-510, including the number of widgets each human interface device 508-510 presents to the human user 506. Each widget may be assigned a sensory load and a cognitive load that the human user is expected to bear, when the widget is in use. Maximum sensory and cognitive load levels may also be stored for the human user 506. Different maxima may be stored for different circumstances, such as routine missions, higher stress level surveillance missions and very high stress combat missions.

The human interface device combination selectors 522 or 524 and the human interface device selection coordinator 530 generate a list of widget combinations that could be used to convey the current data from the data streams 512-514. The human interface device combination selectors 522 or 524 and the human interface device selection coordinator 530 may then calculate sensory and cognitive loads each of these combinations of widgets would impose on the human user 506 and compare these loads to the maximum loads the user can bear, under the circumstances, to ascertain whether all the current data from the data streams 512-514 should be presented, or if less important or less reliable information should be dropped.

Optionally, the human interface device combination selectors 522 or 524 and the human interface device selection coordinator 530 may receive information 532 about the physical environment of the human user 506, such as via another port 534. The information 532 about the physical environment may include, for example, temperature, humidity, ambient light level, ambient sound level, speed and direction of travel and smoothness of the travel path (bumpiness of the travel). This information may be provided by appropriate sensors, such as thermistors, light sensors, microphones and accelerometers.

The human interface device combination selectors 522 or 524 and the human interface device selection coordinator 530 may use the information 532 about the physical environment in making their selections. For example, if the environment is noisy, and an audio human interface device was being used to present information, the human interface device combination selectors 522 or 524 and the human interface device selection coordinator 530 may decrease, possibly to zero, the likelihood of selecting the audio human interface device for subsequent data. Similarly, if ambient lighting conditions would prevent or inhibit use of a heads-up display, selection of such a display may be inhibited. Bumpiness of the ride may influence whether a visual human interface device is used or preferred, or it may influence size of font or icons used to display information, to compensate for jostling of the human user, relative to the heads-up display. A rule-based human interface device combination selector 522 or 524 or human interface device selection coordinator 530 may include one or more rules related to the physical environment of the human user 506.

The information 532 about the physical environment may include information about operational status of the human interface devices 508-510. If one or more of the human interface devices 508-510 is found to have malfunction, the human interface device combination selectors 522 or 524 and the human interface device selection coordinator 530 may cease using the malfunctioned human interface device 508 or 510 and, instead, automatically select another human interface device 508 or 510 to present data. A rule-based human interface device combination selector 522 or 524 or human interface device selection coordinator 530 may include one or more rules related to malfunctioning human interface devices.

The human interface device combination selectors 522 and 524 the human interface device selection coordinator 530 may automatically determine interruptability of the human user 506, such as based on the amount of data recently presented by the system 500 to the human user 506, or based on whether the human user 506 is driving a vehicle, for example as indicated by speed and direction of travel of the human user 506, or based on an automatic analysis of ambient sounds, for example gun firing sounds could indicate a combat situation in which the human user 506 should be interrupted for only critical information. If the human user 506 is determined to be not interruptible, the human interface device combination selector 522 or 524 or the human interface device selection coordinator 530 may delay presentation of the current datum or drop it. A rule-based human interface device combination selector 522 or 524 or human interface device selection coordinator 530 may include one or more rules related to the interruptability of the human user 506.

Optionally, the human interface device combination selectors 522 or 524 and the human interface device selection coordinator 530 may receive information 536 about the physiological state the human user 506, such as via another port 538. The information 536 about the physiological state the human user 506 may include, for example, the human user's stress level or cognitive load, for example as measured by Galvanic skin response, breathing rate, pupil dilation or the like. A rule-based human interface device combination selector 522 or 524 or human interface device selection coordinator 530 may include one or more rules related to the cognitive load of the human user 506.

The human interface device combination selectors 522 or 524 and the human interface device selection coordinator 530 may select a combination of widgets for the current data that impose the least sensory and cognitive load on the human user 506. This selection may be modified to reduce or minimize the amount of shifting of the presentation of a given data stream 512-514 among various widgets. That is, the human interface device combination selectors 522 or 524 and the human interface device selection coordinator 530 may attempt to avoid changing widgets for a given data stream 512-514. In any case, the human interface device combination selectors 522 or 524 and/or the human interface device selection coordinator 530 may use a set of predefined or heuristically developed rules to guide their selections.

It should be noted that each datum may be presented to the human user 506 by a different combination of human interface devices 508-510. That is, from datum to datum of a given data stream 512-514, a different combination of human interface devices 508-510 may be used, although from a physiological standpoint, it is preferable to use the same combination of human interface devices 508-510 for a series of related data, such as a series of map updates or vehicle motor status reports, presented to the human user 506 within a relatively short time span.

With two human interface devices 508 and 510, there are four possible combinations of human interface devices to choose from for each datum, as summarized in Table 1.

TABLE 1

| Combinations of two human interface devices (HIDs) | |
| --- | --- |
| None | Datum is not presented, for example because user's senses are too occupied with other tasks |
| HID 1 | Datum is presented by one HID |
| HID 2 | Datum is presented by the other HID |
| HID 1 + HID2 | Datum is presented by both HIDs |

Thus, zero, one or more of the human interface devices 508-510 may be used to present any given datum. Criteria for selecting the combination of human interface devices 508-510 for a given datum may be stored in a decision tree or any other suitable data structure. The criteria may be implemented by an algorithm or heuristic. Considerations for selecting combinations of human interface devices include the following.

For direction related information, use either a torque sense generator to torque the human user's body in the relevant direction, or use one of a left-right pair of haptic sense generators, such as vibrators, to indicate the relevant direction. Combine the selected tactile or torque sense generator with one of a left-right pair of thermal sense generators to also indicate the relevant direction. Use either an acoustic or visual sense generator to present an attention stimulus, such as an acoustic ping or a red light or arrow pointing in the relevant direction. If the headphones or loudspeakers are capable of generating stereophonic, or more finely resolvable, sound, the attention ping may be generated so as to sound as though it originated from the relevant direction. Such a combination is indicated in FIG. 3 with lines 324, 326 and 328.

For non-direction related information, prefer not to use any torque sense generator, and prefer not to use any sense generators that are worn in opposing pairs, such as left-right pairs, so as to leave these sense generators for direction related information.

For information that conveys a quality, such as engine health, use a thermal sense generator, and use cold to indicate a problem and heat to indicate lack of a problem or resolution of a problem. Gradations of heat or cold can be used to convey information with more granularity than simply binary (hot or cold) temperatures. Combine the thermal stimulus with a visual icon, possibly depicted as an analog gauge to indicate status along a continuum. Color code the visual icon, according to severity of the problem. Use either an acoustic or haptic, preferably vibration, sense generator to present an attention stimulus, such as an acoustic ping or rumble.

Figure 6:
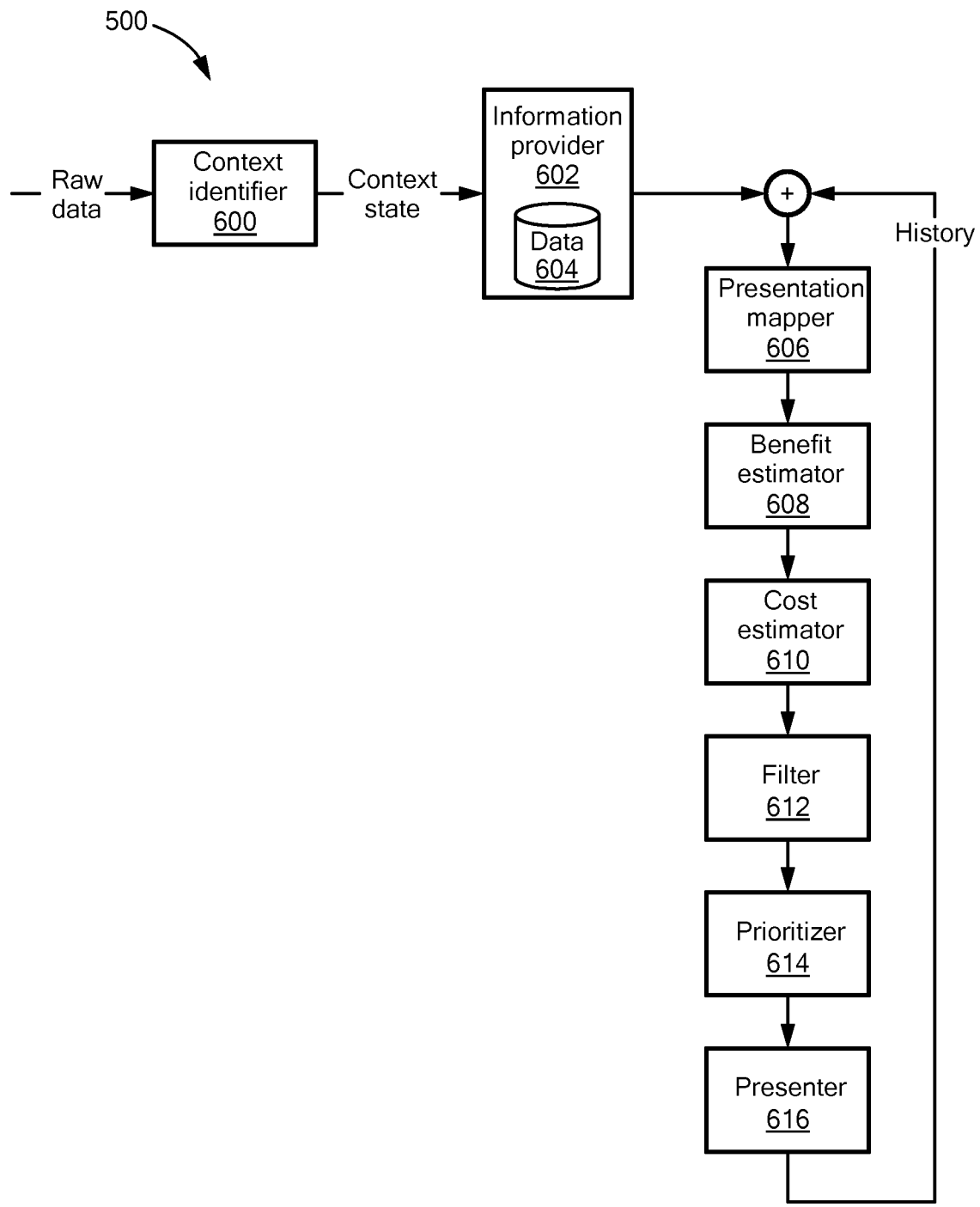
FIG. 6 is a more detailed block diagram of the system 500, according to an embodiment of the present invention.
Figure 7:
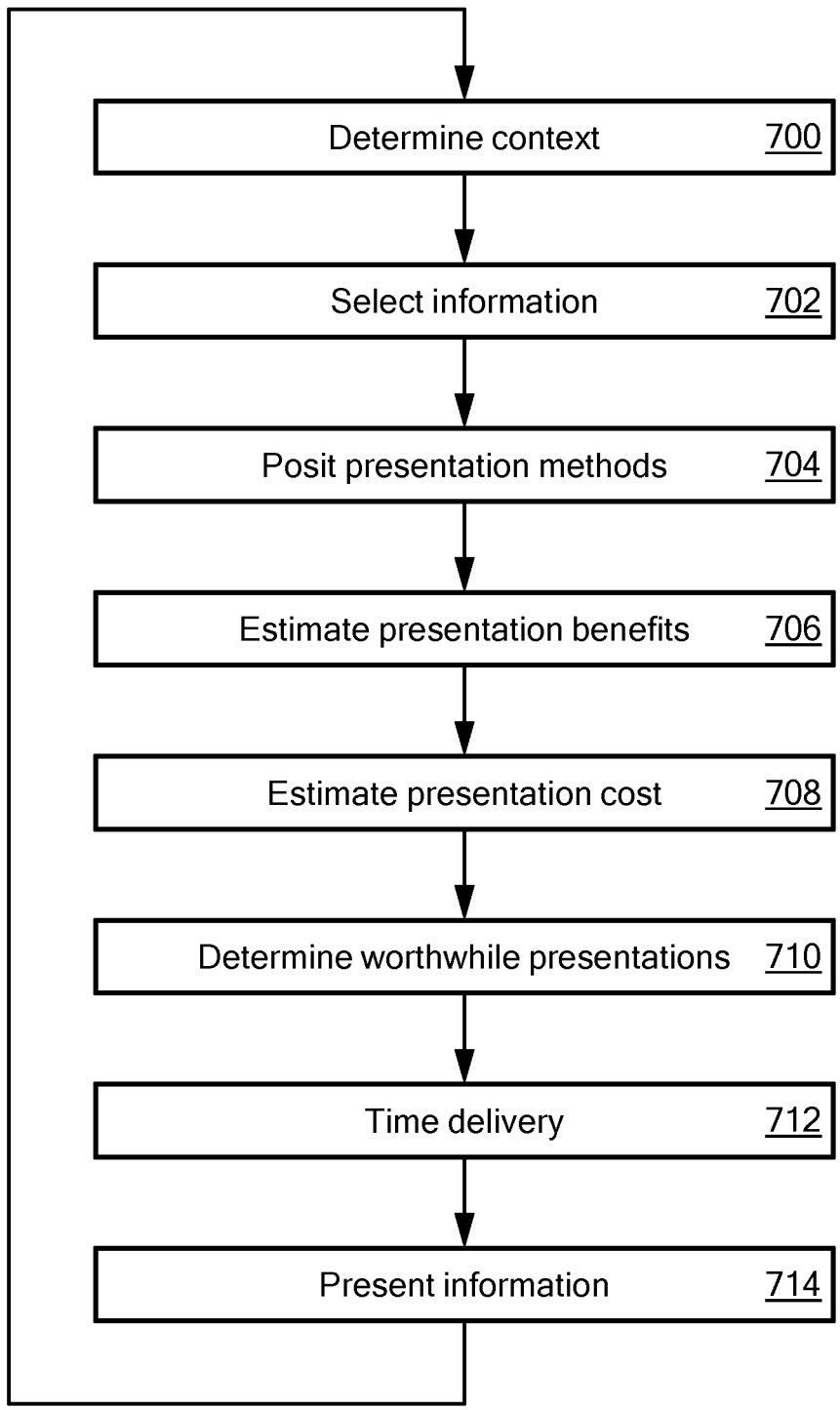
FIG. 7 is a flowchart schematically illustrating operations automatically performed by the system of FIGS. 5 and 6, according to an embodiment of the present invention.

FIG. 6 is a more detailed block diagram of the system 500 (FIG. 5), and FIG. 7 is a flowchart schematically illustrating operations automatically performed by the system 500. At 700, a context of the human user is determined by a context identifier 600. For example, while the human user is driving a car, accelerometers or other sensors measure the speed and direction of the car (represented by raw data in FIG. 6), and the context identifier 600 automatically ascertains that the human user is driving or riding in a car. Physiological sensors may measure the human user's state, such as his cognitive load. This information is also part of the raw data.

If, for example, a text message arrives via one of the data streams 502 or 504 (FIG. 5), the message represents a change in the context, and the context identifier 600 detects and notes the change, communicating the change in state to an information provider 602. The information provider 602 may augment the information in the incoming text message, such as expanding e-mail addresses or telephone numbers in the message into full names from an address book stored in a database 604. The information provider 602 may also be able to extract useful information from metadata that accompanies the message, such as urgency or the sender's identity. Thus, the information provider 602 selects information 702 (FIG. 7) that may be presented to the user. The new message, together with any augmentation, is passed to a presentation mapper 606.

The presentation mapper 606 posits presentation methods 704 (FIG. 7) for the augmented message. The presentation mapper 606 exhaustively combines the augmented message with all possible ways to display the information using all available human interfaces devices and their respective widgets. The presentation mapper 606 generates a list of information/presentation pairs. Each information/presentation pair corresponds to a datum (the augmented message or a portion thereof, in this example) and to a human interface device 508-510 (FIG. 5) on which the information may be presented to the human user.

For example, a text message may be displayed as text on a heads-up display 204 (FIG. 2); the text may be converted to speech by a speech synthesizer and the speech may be played through headphones 206. An automatic semantic analysis may be performed on the augmented message, and some or all of the message may be able to be represented by visual or auditory icons, such as urgency of the message. For example, if the message contains the phrase "late for dinner," the heads-up display may be able to display an icon that has been designated to represent this concept. A subset of the message, such as only a subject line, or perhaps only "envelope" information, such as sender identification, may be able to be conveyed haptically. The list of all possible information/presentation pairs is sent to a benefit estimator 608.

The benefit estimator 608 estimates the benefit of presenting the information to the human user. A level of confidence in the information in the message may be carried as metadata to the message, or the confidence level may be otherwise obtained or calculated. Based on the confidence level, if available, and how well matched the information/presentation pair are, i.e., how appropriate the proposed presentation mode is for presenting the information, the benefit estimator 608 calculates a matching score. The matching score indicates desirability of presenting the datum (augmented message, or portion thereof) by the corresponding human interface device. Some information/presentation pairs will have much lower matching scores than other pairs. This matching score may be used to select which information/presentation pair(s) is(are) presented to the human user.

The benefit estimator 608 may estimate 706 (FIG. 7) benefits of presenting the information. The benefit estimator 608 may calculate a benefit score as a function of the matching score and the confidence level. For example, conveying a message of "I am running three minutes late. I will meet you at the agreed place late." haptically would receive a low benefit score, because of the poor match between the information and the proposed presentation mode (sense). The match is poor, because haptic sense generators cannot generate stimuli with enough resolution or "vocabulary" to effectively convey such a complex concept. Instead, haptic sense generators are better used for alerts and binary status information.

The benefit estimator 608 drops information/presentation pairs whose benefit scores fail to meet a minimum threshold. The benefit estimator 608 combines groups of remaining information/presentation pairs, to the extent that each group could be presented to the human user with the available human interface devices. The benefit estimator 608 calculates a combination benefit score for each of these groups. For example, a group of information/presentation pairs that includes (a) displaying the text message as text on the heads-up display and (b) a visual indication, perhaps an icon, that travel constraints have been relaxed by three minutes would receive a relatively high combination benefit score. This benefit score may be used to select which information/presentation pair(s) is(are) presented to the human user.

The information/presentation pairs and groups of information/presentation pairs, as well as their respective benefit scores and combination benefit scores are sent to a cost estimator 610.

The cost estimator 610 estimates 708 the cost of each proposed presentation. The cost estimator 610 calculates an opportunity cost to the system 500 to present the information/presentation pair or group of information/presentation pairs, as well as a cognitive cost to the user to receive the information/presentation pair or group of information/presentation pairs. The opportunity cost to the system 500 relates primarily to how many resources are needed for the information/presentation pair. For example, longer text messages incur larger opportunity costs than shorter text messages. Predetermined values and/or predetermined functions may be stored for opportunity costs for all possible presentations, such as in a look-up table. Then the cost estimator 610 may add up the values that correspond to the combination of presentations that would be required for each information/presentation pair or group of information/presentation pairs to arrive at a total opportunity cost. Similarly, values for cognitive costs for various types of information, conveyed using various senses, may be tabulated or calculated according to predefined formulae.

A filter 612 performs a cost/benefit analysis 710 (FIG. 7). The filter 612 compares (a) a combination of the opportunity cost and the cognitive cost to (b) the benefit score. If the benefit exceeds the total cost, the information is presented to the human user. For example, the benefit of delivering a visual text message to inform the human user that another person is going to be three minutes late likely exceeds the costs calculated for such a message. However, the benefit of including an audio alert may not be sufficient to exceed the opportunity cost of delivering such an alert. Cost and threshold values may be adjusted, based on the context. For example, both costs and thresholds may be increased for warfighters, as compared to movie goers.

At 712 (FIG. 7), a prioritizer 614 determines timing of the presentations, such as based on the human user's interruptability. For example, in the case of a user driving a car, the prioritizer waits until the context identifier 600 ascertains the car has stopped, such as at a red traffic light, at which time a presenter 616 presents the information 714 (FIG. 7). As shown in the flowchart in FIG. 7, the process operates continuously, repeating for each datum received from a data stream 512-514.

The data presentation mapper 516 and its components, the human interface selectors 522 and 524, the human interface selection coordinator 530 and the data presenters 526 and 528 (FIG. 5) and the context identifier 600, information provider 602, presentation mapper 606, benefit estimator 608, cost estimator 610, filter 612, prioritizer 614 and presenter 616 may all or each be implemented by a processor executing instructions stored in a memory to perform processes, operations and functions, and make comparisons and decisions, as described herein.

While the invention is described through the above-described exemplary embodiments, modifications to, and variations of, the illustrated embodiments may be made without departing from the inventive concepts disclosed herein. For example, although specific parameter values, such as numbers of human interface devices or thresholds, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list, unless otherwise indicated. As used herein, including in the claims, the term "or," used in connection with a list of items, means one or more of the items in the list, i.e., at least one of the items in the list, but not necessarily all the items in the list, unless otherwise indicated. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "process" and like terms are for convenience and not intended to limit their implementation. All or a portion of each block, module, process or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

Embodiments, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A system for increasing situational awareness by a human user, the system comprising:
   a first port configured to receive a first stream of data from a first data source, each first datum of the first stream of data representing respective information from the first data source;
   a second port configured to receive a second stream of data, distinct from the first stream of data, from a second data source, each second datum of the second stream of data representing respective information from the second data source;
   at least two human interface devices, each human interface device of the at least two human interface devices being configured to stimulate a different respective sense of the human user; and
   a data presentation mapper configured to, as the first stream of data is received and as the second stream of data is received, automatically:
   select, for each first datum, a respective first combination of human interface devices from among the at least two human interface devices;
   select, for each second datum, a respective second combination of human interface devices from among the at least two human interface devices;
   coordinate each selection of the respective first combination of human interface devices with each selection of the respective second combination of human interface devices, such that each selection of the respective first combination of human interface devices influences each selection of the respective second combination of human interface devices;
   present each first datum via the respective first combination of human interface devices; and
   present each second datum via the respective second combination of human interface devices.

2. A system according to claim 1, wherein the first stream of data and the second stream of data each represents information that is imperceptible by unaided human senses of the human user observing the real world.

3. A system according to claim 2, wherein the first stream of data represents information about a vehicle.

4. A system according to claim 1, wherein at least one human interface device of the at least two human interface devices is configured to allow the human user to directly perceive the real world using the respective sense of the human user.

5. A system according to claim 1, wherein the at least two human interface devices comprise at least three human interface devices, each human interface device of the at least three human interface devices being configured to stimulate a different respective sense of the human user.

6. A system according to claim 5, wherein each human interface device of the at least three human interface devices is configured to generate one respective different kind of stimulus: a visual stimulus to a receptor cell, an auditory stimulus to a receptor cell, a thermal stimulus to a receptor cell, a torque stimulus to a receptor cell, a tactile stimulus to a receptor cell, an olfactory stimulus to a receptor cell, a taste stimulus to a receptor cell, a stimulus delivered directly to a nerve without an intervening receptor cell or a stimulus delivered directly to a central nervous system without an intervening receptor cell.

7. A system according to claim 6, wherein at least one human interface device of the at least three human interface devices is configured to be worn by the human user.

8. A system according to claim 6, wherein each human interface device of the at least three human interface devices is configured to be worn by the human user.

9. A system according to claim 6, wherein:
each human interface device of the at least three human interface devices is configured to generate at least two different types of stimuli of the respective kind of stimulus, wherein the at least two different types of stimuli are configured to be perceived differently by the human user; and
the data presentation mapper is configured to automatically:
select, for each first datum, for each human interface device of the first combination of human interface devices, a respective first type of stimulus from among the at least two different types stimuli of the respective human interface device and generate, via the respective human interface device, a stimulus of the selected respective first type; and
select, for each second datum, for each human interface device of the second combination of human interface devices, a respective second type of stimulus from among the at least two different types stimuli of the respective human interface device and generate, via the respective human interface device, a stimulus of the selected respective second type.

10. A system according to claim 9, wherein at least one human interface device of the at least three human interface devices is configured to generate a thermal stimulus, wherein the at least two different types of stimuli comprise at least two of: a steady temperature greater than about 34° C., a steady temperature less than about 34° C. and a temperature that changes over time from a first predetermined temperature to a second predetermined temperature.

11. A system according to claim 5, wherein:
each first combination of human interface devices comprises at least zero human interface device of the at least three human interface devices; and
each second combination of human interface devices comprises at least zero human interface device of the at least three human interface devices.

12. A system according to claim 5, wherein:
each first combination of human interface devices comprises at least one human interface device of the at least three human interface devices; and
each second combination of human interface devices comprises at least one human interface device of the at least three human interface devices.

13. A system according to claim 5, wherein:
each first combination of human interface devices comprises at least two human interface device of the at least three human interface devices; and
each second combination of human interface devices comprises at least two human interface device of the at least three human interface devices.

14. A system according to claim 5, wherein:
each first combination of human interface devices comprises at least three human interface device of the at least three human interface devices; and
each second combination of human interface devices comprises at least three human interface device of the at least three human interface devices.

15. A system according to claim 1, wherein the at least two human interface devices comprise at least four human interface devices, each human interface device of the at least four human interface devices being configured to stimulate a different respective sense of the human user.

16. A system according to claim 1, wherein the data presentation mapper is configured to automatically select the first and second combinations of human interface devices based on a set of rules.

17. A system according to claim 16, further comprising:
a third port configured to receive information about a physical environment of the human user;
wherein the set of rules comprises a rule related to the physical environment of the human user.

18. A system according to claim 17, wherein:
the information about the physical environment comprises information about an ambient sound level in the physical environment; and
the set of rules includes a rule that causes automatic presentation of data from a given data source by a human interface device, other than a human interface device configured to generate an auditory stimulus, when: (a) the ambient sound level is greater than a predetermined level and (b) data from the given data source was previously presented, within a predetermined amount of time, by a human interface device configured to generate an auditory stimulus.

19. A system according to claim 17, wherein:
the information about the physical environment comprises information about operational status of the at least two human interface devices; and
the set of rules includes a rule that automatically ceases presentation of data by a first human interface device of the at least two human interface devices and automatically selects another human interface device of the at least two human interface devices, when the operational status indicates the first human interface device has malfunctioned.

20. A system according to claim 17, wherein:
the data presentation mapper is configured to automatically determine interruptability of the human user; and
the set of rules includes a rule that causes automatic delay of presentation of at least some data when the interruptability of the human user exceeds a predetermined value.

21. A system according to claim 16, further comprising:
a fourth port configured to receive information about a physiological state of the human user;
wherein the set of rules comprises a rule related to the physiological state of the human user.

22. A system according to claim 21, wherein the physiological state of the human user comprises a cognitive load level of the human user.

23. A system according to claim 1, wherein the data presentation mapper is configured to automatically:
generate, for each datum of the first datum and the second datum, a list of information/presentation pairs, each information/presentation pair corresponding to the datum and to a human interface device, of the at least two human interface devices, capable of presenting the datum; and
determine, for each information/presentation pair, a matching score indicative of desirability of presenting the corresponding datum by the corresponding human interface device;
wherein selection of each first combination of human interface devices and each second combination of human interface devices is based, at least in part, on the matching score exceeding a predetermined value.

24. A system according to claim 23, wherein:
   each datum has a corresponding confidence level; and
   the selection of each first combination of human interface devices and the selection of each second combination of human interface devices are based, at least in part, on the confidence level of the corresponding datum exceeding a predetermined value.

25. A system according to claim 24, wherein the data presentation mapper is configured to automatically:
   determine, for each information/presentation pair, a benefit score, as a function of the matching score and the confidence level;
   select, from the list of information/presentation pairs, information/presentation pairs that have respective benefit scores greater than a predetermined value, thereby selecting a plurality of information/presentation pair candidates;
   generate a plurality of combinations of at least two of the information/presentation pair candidates; and
   determine, for each combination of the at least two of the information/presentation pair candidates, a combination benefit score;
   wherein the selection of each first combination of human interface devices and the selection of each second combination of human interface devices are based, at least in part, on the combination benefit score exceeding a predetermined value.

26. A system according to claim 25, wherein the data presentation mapper is configured to automatically:
   determine, for each information/presentation pair candidate and for each combination of at least two information/presentation pair candidates, an opportunity cost to the system to present the respective information/presentation pair candidate and the respective combination of at least two information/presentation pair candidates;
   determine, for each information/presentation pair candidate and for each combination of at least two information/presentation pair candidates, a cognitive cost to the user to receive the respective information/presentation pair candidate and the respective combination of at least two information/presentation pair candidates;
   compare, for each information/presentation pair candidate and for each combination of at least two of the information/presentation pair candidates: (a) a combination of the respective opportunity cost and the respective cognitive cost to (b) the respective benefit score or combination benefit score, as the case may be, thereby performing a cost/benefit comparison;
   wherein the selection of each first combination of human interface devices and the selection of each second combination of human interface devices are based, at least in part, on benefit exceeding cost in the cost/benefit comparison.

27. A method for increasing situational awareness by a human user, the method comprising:
   receiving, via a first port, a first stream of data from a first data source, each first datum of the first stream of data representing respective information from the first data source;
   receiving, via a second port, a second stream of data, distinct from the first stream of data, from a second data source, each second datum of the second stream of data representing respective information from the second data source;
   providing at least two human interface devices, each human interface device of the at least two human interface devices being configured to stimulate a different respective sense of the human user; and
   as the first stream of data is received and as the second stream of data is received, automatically:
      selecting, for each first datum, a respective first combination of human interface devices from among the at least two human interface devices;
      selecting, for each second datum, a respective second combination of human interface devices from among the at least two human interface devices;
      coordinating each selection of the respective first combination of human interface devices with each selection of the respective second combination of human interface devices, such that each selection of the respective first combination of human interface devices influences each selection of the respective second combination of human interface devices;
      presenting each first datum via the respective first combination of human interface devices; and
      presenting each second datum via the respective second combination of human interface devices.

28. A non-transitory computer-readable medium encoded with instructions that, when executed by a processor, establish processes for performing a computer-implemented method of increasing situational awareness by a human user, the processes comprising:
   a process configured to receive, via a first port, a first stream of data from a first data source, each first datum of the first stream of data representing respective information from the first data source;
   a process configured to receive, via a second port, a second stream of data, distinct from the first stream of data, from a second data source, each second datum of the second stream of data representing respective information from the second data source;
   a process configured to control at least two human interface devices, each human interface device of the at least two human interface devices being configured to stimulate a different respective sense of the human user; and
   as the first stream of data is received and as the second stream of data is received:
      a process configured to automatically select, for each first datum, a respective first combination of human interface devices from among the at least two human interface devices;
      a process configured to automatically select, for each second datum, a respective second combination of human interface devices from among the at least two human interface devices;
      a process configured to automatically coordinate each selection of the respective first combination of human interface devices with each selection of the respective second combination of human interface devices, such that each selection of the respective first combination of human interface devices influences each selection of the respective second combination of human interface devices;
      a process configured to automatically present each first datum via the respective first combination of human interface devices; and
      a process configured to automatically present each second datum via the respective second combination of human interface devices.

* * * * *